[19] United States Patent
Hines

[11] Patent Number: 6,012,279
[45] Date of Patent: Jan. 11, 2000

[54] GAS TURBINE ENGINE WITH WATER INJECTION

[75] Inventor: William R. Hines, Cincinnati, Ohio

[73] Assignee: General Electric Company, Cincinnati, Ohio

[21] Appl. No.: 08/866,967

[22] Filed: Jun. 2, 1997

[51] Int. Cl.[7] ....................................... F02C 3/30
[52] U.S. Cl. ........................... 60/39.05; 60/39.53; 60/728
[58] Field of Search .............................. 60/39.05, 39.181, 60/39.53, 728, 39.3, 39.58, 39.59

[56] References Cited

U.S. PATENT DOCUMENTS

| | | | |
|---|---|---|---|
| 2,115,338 | 4/1938 | Lysholm | 60/39.05 |
| 2,678,531 | 5/1954 | Miller | 60/39.53 |
| 4,301,649 | 11/1981 | Walker . | |
| 4,448,018 | 5/1984 | Sayama et al. | 60/728 |
| 4,896,499 | 1/1990 | Rice . | |
| 4,984,426 | 1/1991 | Santi . | |
| 4,991,391 | 2/1991 | Kosinski . | |
| 5,390,646 | 2/1995 | Swenson . | |
| 5,463,873 | 11/1995 | Early et al. . | |
| 5,535,584 | 7/1996 | Janes . | |
| 5,553,448 | 9/1996 | Farrell et al. . | |
| 5,577,378 | 11/1996 | Althaus et al. . | |
| 5,581,997 | 12/1996 | Janes . | |
| 5,622,044 | 4/1997 | Bronicki et al. | 60/728 |
| 5,669,217 | 9/1997 | Anderson | 60/728 |

FOREIGN PATENT DOCUMENTS

| | | | |
|---|---|---|---|
| 1007140 | 5/1952 | France | 60/39.53 |
| 286978 | 11/1952 | Switzerland | 60/39.53 |

*Primary Examiner*—Louis J. Casaregola
*Attorney, Agent, or Firm*—Andrew C. Hess; Rodney M. Young

[57] ABSTRACT

Precompressor and pre-booster water spray injection apparatus and methods are described. In an exemplary embodiment, a gas turbine engine suitable for use in connection with water spray injection includes a low pressure compressor, a high pressure compressor, and a combustor. The engine also includes a high pressure turbine, a low pressure turbine, and a power turbine. A water injection apparatus is provided for injecting water into an inlet of the high pressure compressor. The water spray injection apparatus is in flow communication with a water supply, and during engine operation, water is delivered from such supply through the injection apparatus to the inlet of the compressor.

14 Claims, 5 Drawing Sheets

GAS TURBINE ENGINE WITH WATER INJECTION

FIELD OF THE INVENTION

This invention relates generally to gas turbine engines and more particularly, to prebooster and precompressor water injection in a gas turbine engine.

BACKGROUND OF THE INVENTION

Gas turbine engines typically include a compressor for compressing a working fluid, such as air. The compressed air is injected into a combustor which heats the fluid causing it to expand, and the expanded fluid is forced through a turbine. The compressor typically includes a low pressure compressor and a high pressure compressor.

The output of known gas turbine engines may be limited by the temperature of the working fluid at the output of the high pressure compressor, sometimes referred to as "T3", and by the temperature of the working fluid in the combustor outlet, sometimes referred to as "T41". To reduce both the T3 and T41 temperatures, it is known to use an intercooler positioned in the fluid flow path between the low pressure compressor and the high pressure compressor. In operation, the intercooler extracts heat from the air compressed in the low pressure compressor, which reduces both the temperature and volume of air entering the high pressure compressor. Such reduction in temperature reduces both the T3 and T41 temperatures while reducing compressor required horsepower, and greater output can be achieved.

Typically, cool water or air circulates through the intercooler, and heat is transferred from the air flow to the cool water or air. The water or air absorbs the heat, and the heated water or air is then removed. Removing the heated water or air results in losses in total cycle thermal efficiency. Therefore, although an intercooler increases power output, the intercooler reduces thermal efficiency of the engine, especially if the cycle pressure ratio is less than about 27. The intercooler also introduces pressure losses associated with the removal of air, the actual cooling of that air, and ducting it back to the compressor. Further, it is impractical for an intercooler to also provide interstage cooling.

With at least some known intercoolers, the heated water is removed using a water cooler which dissipates the heated water through a cooling tower as vapor into the environment. Of course, releasing the vapor into the environment raises environmental concerns. Also, a significant amount of water is required by such intercoolers, and such high water consumption increases the operational costs.

It would be desirable to provide a partial increased power output achieved with intercoolers yet also provide improved thermal efficiency as compared to known intercoolers having up to 40% effectivity, where effectivity equals [(the booster discharge temperature (T23)–the compressor inlet temperature (T25))/(T23–$T_{coolant}$)] (note: for calculation purposes, $T_{coolant}$ was assumed to equal 59° F.). It also would be desirable to provide increased power output even for single rotor gas turbines.

SUMMARY OF THE INVENTION

These and other objects may be attained by a gas turbine engine including prebooster or precompressor water injection which provides many of the same advantages of intercooling yet overcomes some shortcomings of intercooling. For example, water spray injection can provide a power increase equivalent to an intercooler with 90% effectivity. Further, 1% booster water spray injection increases fuel consumption less than that for an intercooler having an effectivity up to 40%, although compressor water spray injection in all cases gives more fuel consumption than an intercooler with any effectivity from 0 to 90+%. The % water spray injection as used herein refers to the amount of water spray as compared to the air flow into the booster for booster water spray injection and compared to the air flow into the compressor for compressor water spray injection. In addition, with water spray injection, far less water is utilized and very little, if any, water is released into the environment. With water spray injection, all water exits the cycle as water vapor at exhaust gas temperature.

In an exemplary embodiment, a gas turbine engine suitable for use in connection with water spray injection includes a low pressure compressor, a high pressure compressor, and a combustor. The engine also includes a high pressure turbine, a low pressure turbine, and a power turbine. A water injection apparatus is provided for injecting water into an inlet of the high pressure compressor. The water spray injection apparatus is in flow communication with a water supply, and during engine operation, water is delivered from such supply through the injection apparatus to the inlet of the compressor. Waste heat boilers may be located downstream of the power turbine as is known in the art.

In operation, air flows through the low pressure compressor, and compressed air is supplied from the low pressure compressor to the high pressure compressor. In addition, a water spray is supplied to the inlet of the high pressure compressor, and the water spray enters into the high pressure compressor through the inlet. Due to the high temperature environment at the location at which the water spray is injected, the water spray partially evaporates before entering the high pressure compressor. The water spray cools the air flow in the high pressure compressor for at least each stage of compression through which such spray flows, i.e., until it evaporates. Usually, by the sixth stage of the high pressure compressor, the water spray is evaporated for 3% compressor water spray injection.

The air and water vapor is further compressed by the high pressure compressor, and the highly compressed air is delivered to the combustor. Airflow from the combustor drives the high pressure turbine, the low pressure turbine, and the power turbine. Waste heat is captured by the boilers, and the heat from the boilers in the form of steam is delivered to upstream components.

The water spray provides an advantage in that the temperature of the airflow at the outlet of the high pressure compressor (temperature T3) and the temperature of the airflow at the outlet of the combustor (temperature T41) are reduced as compared to such temperatures without the spray. Specifically, the water spray extracts heat from the hot air flowing into and through the high pressure compressor, and by extracting such heat from the air flow, the T3 and T41 temperatures are reduced and compressive horsepower is reduced. The heat is removed as the water vaporizes. Reducing the T3 and T41 temperatures provides the advantage that the engine is not T3 and T41 constrained, and therefore, the engine may operate at higher output levels than is possible without such water spray.

DETAILED DESCRIPTION

Set forth below are exemplary configurations of water spray injection in accordance with various embodiments of the present invention. Initially, it should be understood that although specific implementations are illustrated and described, water spray injection can be practiced using many alternative structures and in a wide variety of engines. In addition, and as described below in more detail, water spray injection can be performed at the inlet of a high pressure compressor, at an inlet of the booster, or at both locations.

Water spray injection provides many of the same advantages of intercooling yet overcomes some shortcomings of intercooling. For example, and with intercooling, the heated water (or air) is removed and removal of such heated water (or air) reduces the thermal efficiency of the cycle as well as creates environmental concerns. The significant power increase provided by intercooling typically overcomes the shortcomings associated with intercooling and as a result, intercooling often is utilized when extra power is required using a different or larger airflow booster and a larger high pressure turbine flow function. Water spray injection, as described below, provides a power increase which may be somewhat less than the maximum power increase provided in a similarly situated intercooler. With water spray injection, however, far less water is utilized and water exits the cycle as water vapor at exhaust gas temperature.

Figure 1:
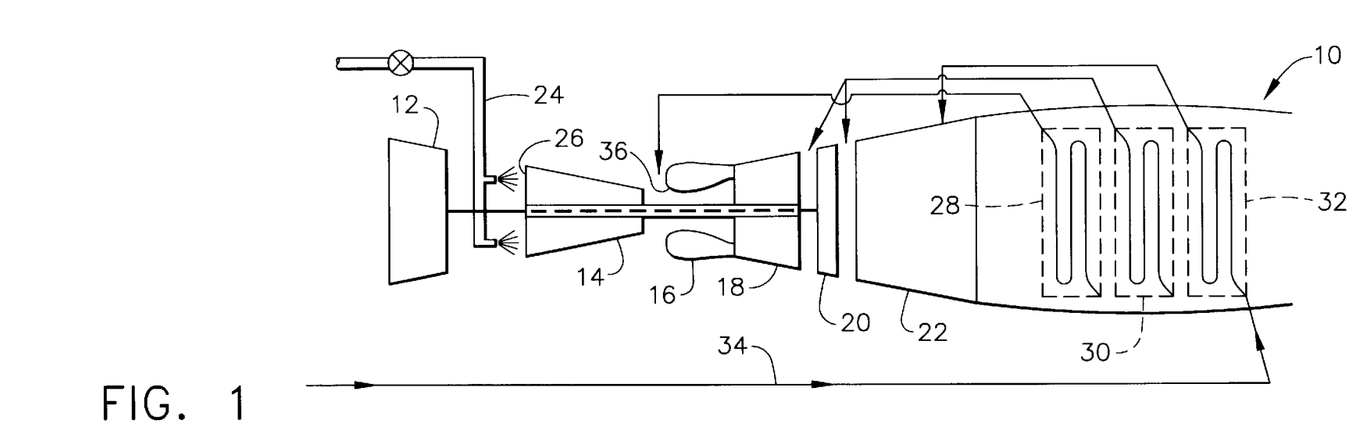
FIG. 1 is a schematic illustration of a gas turbine engine including compressor water injection in accordance with one embodiment of the present invention.

Referring now specifically to the drawings, FIG. 1 is a schematic illustration of a gas turbine engine 10 which, as is well known, includes a low pressure compressor 12, a high pressure compressor 14, and a combustor 16. Engine 10 also includes a high pressure turbine 18, a low pressure turbine 20, and a power turbine 22. Engine 10 further includes a water injection apparatus 24 for injecting water into an inlet 26 of high pressure compressor 14. Further details regarding water injection apparatus 22 are set forth below. For purposes of FIG. 1, however, it should be understood that apparatus 24 is in flow communication with a water supply (not shown) and water is delivered from such supply through apparatus 24 to inlet 26 of compressor 14. Apparatus 24 may also be air aspirated using a bleed source off compressor 14 to provide a finer spray mist. Waste heat boilers 28, 30, and 32 are located downstream of power turbine 22. As is known in the art, feed water is supplied to boilers 28, 30, and 32 via a feedwater line 34, and water in the form of steam is communicated from boilers 28, 30, and 32 to various upstream components. Particularly, steam from boiler 28 is provided to an inlet 36 of combustor 16, steam from boiler 30 is provided to an inlet of low pressure turbine 20 and an inlet of power turbine 22, and steam from boiler 32 is provided to a last stage of power turbine 22. Except for water spray injection apparatus 24, the various components of turbine 10 are known in the art.

In operation, air flows through low pressure compressor 12, and compressed air is supplied from low pressure compressor 12 to high pressure compressor 14. In addition, a water spray is supplied to inlet 26 of high pressure compressor 14, and the water spray enters into compressor 14 through inlet 26. Due to the high temperature environment at the location at which the water spray is injected, the water spray partially evaporates before entering high pressure compressor 14. The water spray cools the air flow in high pressure compressor 14 for at least each stage of compressor 14 through which such spray flows, i.e., until it evaporates. Usually, by the sixth stage of compressor 14, the water spray is totally evaporated.

The air is further compressed by high pressure compressor 14, and highly compressed air is delivered to combustor 16. Airflow from combustor 16 drives high pressure turbine 18, low pressure turbine 20, and power turbine 22. Waste heat is captured by boilers 28, 30, and 32, and the waste heat steam is delivered to upstream components coupled to boilers 28, 30 and 32 as described above.

The water particles from water spray apparatus 24 provide the advantage that the temperature of the airflow at the outlet of high pressure compressor 14 (temperature T3) and the temperature of the airflow at the outlet of combustor 16 (temperature T41) are reduced as compared to such temperatures without the spray. Specifically, the water spray extracts heat from the hot air flowing into and through compressor 14, and by extracting such heat from the air flow, the T3 and T41 temperatures are reduced along with the required compressor power. Reducing the T3 and T41 temperatures provides the advantage that engine 10 is not T3 and T41 constrained, and therefore, engine 10 may operate at higher output levels by throttle pushing than is possible without such water spray. In addition to increased power output, water spray injection as described above provides the advantage of less water consumption as compared to intercooling under the same conditions.

Figure 2:
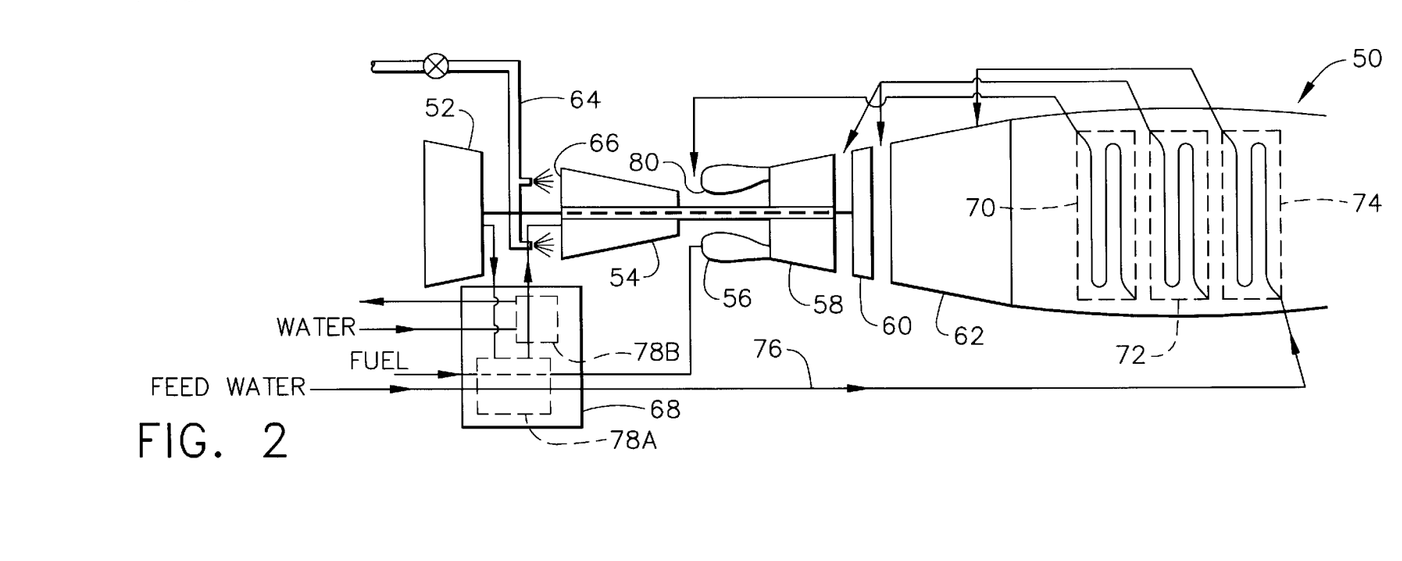
FIG. 2 is a schematic illustration of a gas turbine engine including compressor water injection and intercooling in accordance with another embodiment of the present invention.

FIG. 2 is a cross-sectional view of another embodiment of a gas turbine engine 50 including water spray injection. Engine 50 includes a low pressure compressor 52, a high pressure compressor 54, and a combustor 56. Engine 50 also includes a high pressure turbine 58, a lower pressure turbine 60, and a power turbine 62. Engine 50 further includes a water injection apparatus 64 for injecting water into an inlet 66 of high pressure compressor 54. For purposes of FIG. 2, it should be understood that apparatus 64 is in flow communication with a water supply (not shown) and water is delivered from such supply through apparatus 64 to inlet 66 of compressor 54. An intercooler 68 also is positioned in series flow relationship with booster 52 to receive at least a portion or all of the air flow output by booster 52, and the output of intercooler 68 is coupled to inlet 66 of compressor 54. Of course, cooling water is supplied to intercooler 68 as illustrated or blower fans could be used for air cooling. Intercooler 68 could, for example, be one of the intercoolers described in U.S. Pat. No. 4,949,544.

Waste heat boilers 70, 72, and 74 are located downstream of power turbine 62. As is known in the art, feed water is supplied to boilers 70, 72, and 74 via a feedwater line 76 which extends through a first stage 78A of intercooler 68, and steam is communicated from boilers 70, 72, and 74 to various upstream components. Particularly, steam from boiler 70 is provided to an inlet 80 of combustor 56, steam from boiler 72 is provided to an inlet of low pressure turbine 60 and an inlet of power turbine 62, and steam from boiler 74 is provided to a last stage of power turbine 62. Except for water spray injection apparatus 64, the various components of turbine 50 are known in the art.

In operation, air flows through low pressure compressor 52, and compressed air is supplied from low pressure compressor 52 to high pressure compressor 54. At least some or all compressed air from low pressure compressor 52 is diverted to flow through a second stage 78B of intercooler 68, and such diverted air is cooled and supplied to inlet 66 of high pressure compressor 54. In addition, a water spray is supplied to inlet 66 of high pressure compressor 54, and the water spray enters into compressor 54 through inlet 66. Due to the higher temperature environment at the location at which the water spray is injected, the water spray partially evaporates before entering high pressure compressor 54. The water spray cools the air flow in high pressure compressor 54 for at least each stage of compressor 54 through which such spray flows, i.e., until it evaporates. Usually, by the sixth stage of compressor 54, the water spray is evaporated.

The air is further compressed by high pressure compressor 54, and highly compressed air is delivered to combustor 56. Airflow from combustor 56 drives high pressure turbine 58, low pressure turbine 60, and power turbine 62. Waste heat is captured by boilers 70, 72, and 74, and the waste heat as steam is delivered to upstream components coupled to boilers 70, 72, and 74 as described above.

By providing a combination of intercooling and water spray injection, it is believed that increased power output is provided by engine 50 as compared to engine 10. Intercooler 68 could take the flow field into the compressor down in temperature to where condensate could appear from ambient humidity. The water spray then could be added into compressor 54 to further reduce T3 at its exit along with reducing its power required to run. However, engine 50 requires more water as compared to engine 10, and engine 50 does dissipate some water to the environment, due to operation of intercooler 68 along with the additional water spray exiting the stack as a vapor at exhaust stack temperature. As compared to the results obtained if only intercooling is used to achieve a power output of engine 50, however, the combination of water spray injection and intercooling results in more water consumption.

Figure 3:
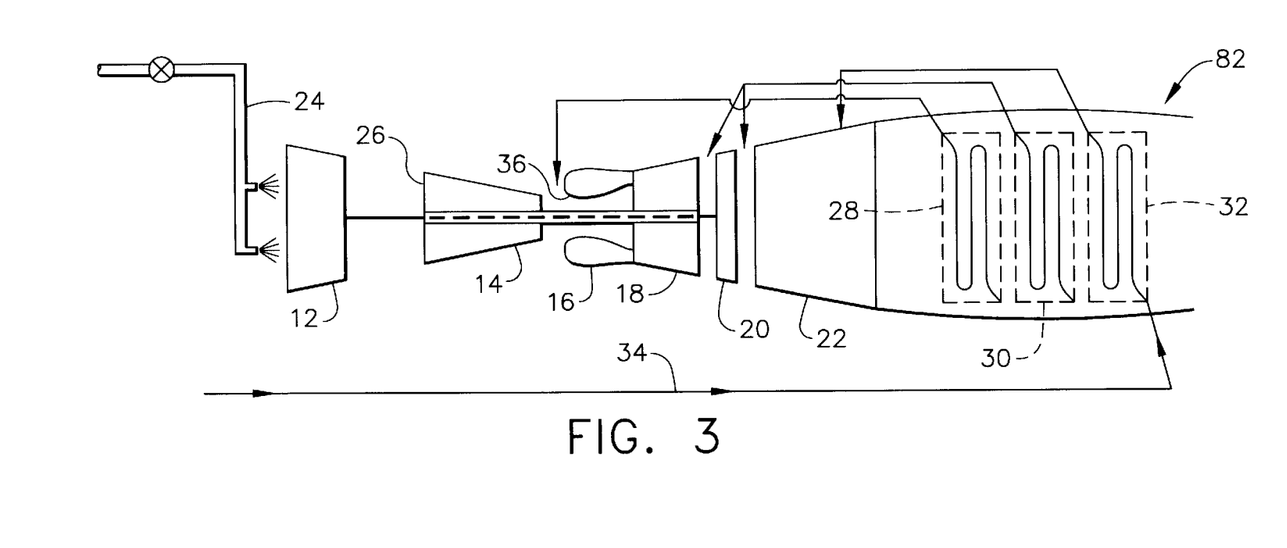
FIG. 3 is a schematic illustration of a gas turbine engine including booster water injection in accordance with one embodiment of the present invention.

Although not shown in the exemplary configuration set forth in FIG. 2, it is contemplated that rather than, or in addition to, water spray injection at inlet 80 of high pressure compressor 56, such injection can be performed at the inlet of low pressure compressor, or booster, 52 (booster water spray injection is illustrated in FIG. 3). Similar advantages in the decrease of T3 and T41 temperatures may be achieved by such injection.

An exemplary configuration of an engine 82 including booster water spray injection is set forth in FIG. 3. The configuration of engine 82 is substantially similar to engine 10 shown in FIG. 1 with the exception that water spray injection apparatus 24 is located at an inlet of low pressure compressor, or booster, 12. In engine 82, water is injected into booster 12 and cools the air flowing through booster 12. Cooling the air flow through booster 12 provides the advantages of decreasing T3 and T41 temperatures as described above. Only about 1% water spray can be injected into booster 12, which water will evaporate by the end of the booster.

Figure 4:
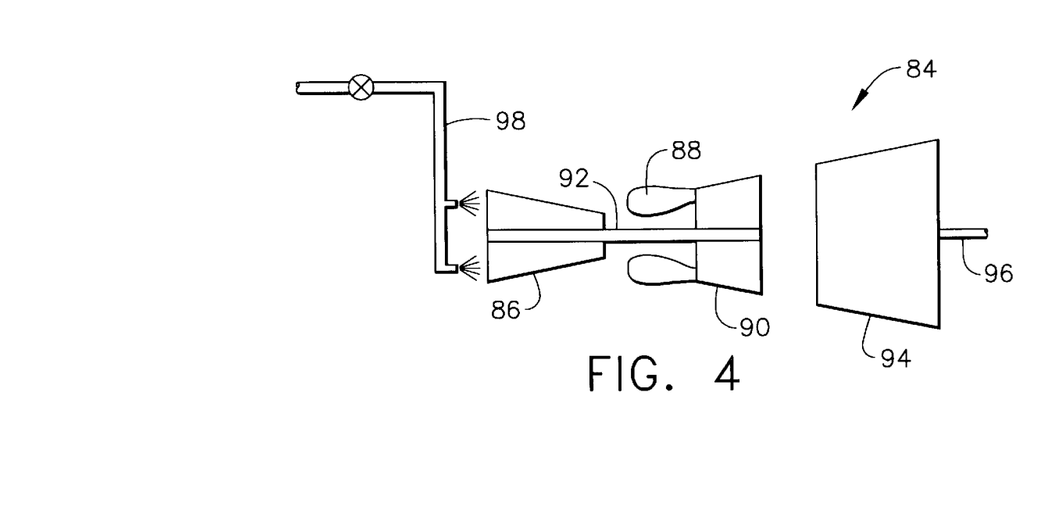
FIG. 4 is a schematic illustration of a single rotor gas turbine engine including compressor water injection in accordance with another embodiment of the present invention.

FIG. 4 is a schematic illustration of a single rotor gas turbine engine 84 including compressor water injection in accordance with yet another embodiment of the present invention. Engine 84 includes a compressor 86, a combustor 88, and a high pressure turbine 90. Turbine 90 and compressor 86 are coupled by a first shaft 92. A second free wheeling power turbine 94 is located downstream of high pressure turbine 90. Power turbine 94 is coupled to a second shaft 96. Water spray injection apparatus 98 is provided at the inlet of compressor 86. By spraying water into the inlet of compressor 86, the advantage of the decrease of T3 and T41 temperatures may be achieved by such injection.

Figure 5:
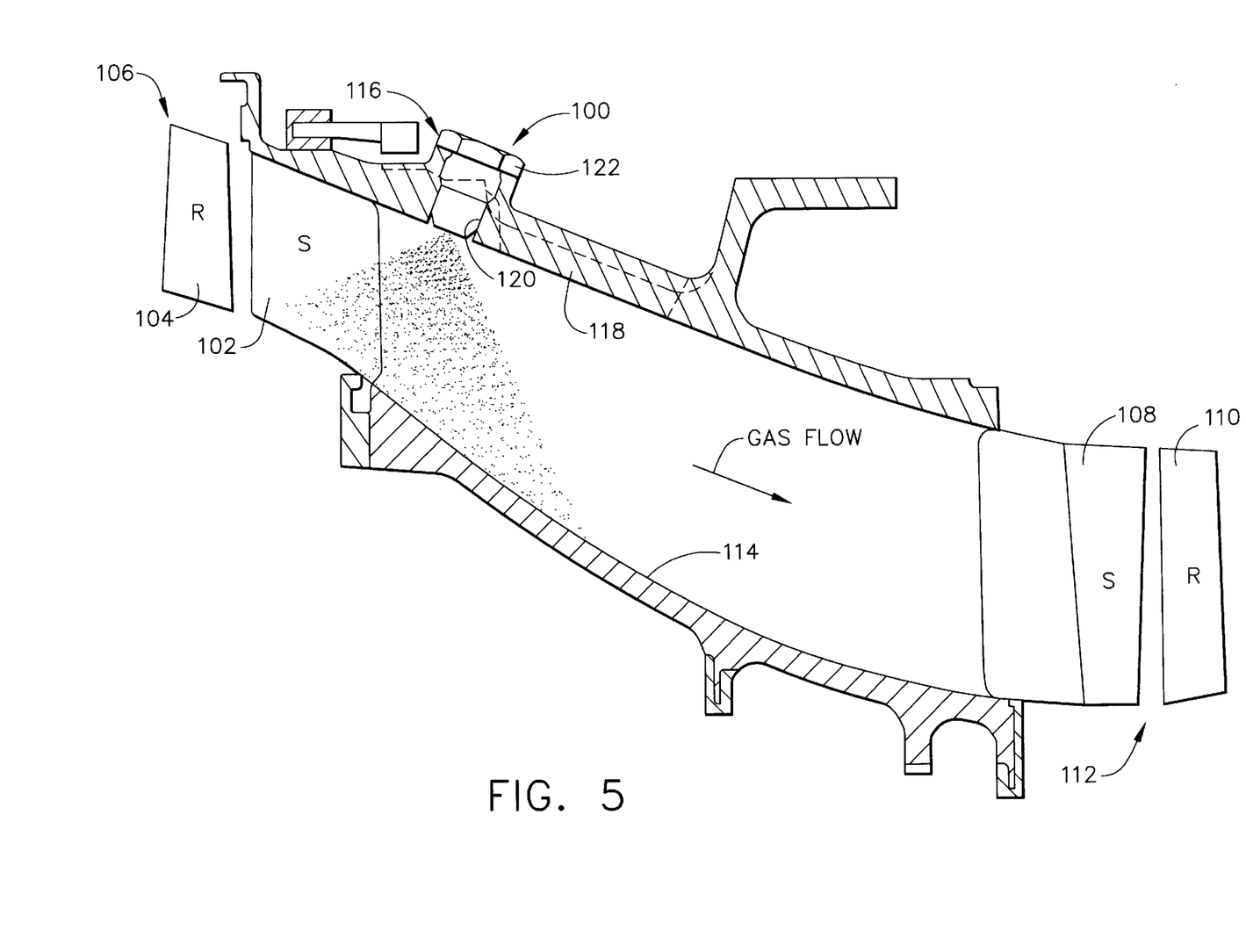
FIG. 5 is a side view of apparatus for high pressure compressor water injection in accordance with one embodiment of the present invention.

FIG. 5 is a side view of an exemplary embodiment of apparatus 100 for water injection. Stator and rotor blades 102 and 104 of a booster 106 and stator and rotor blades 108 and 110 of a high pressure compressor 112 are shown to illustrate the location of apparatus 100 relative to booster 106 and compressor 112. Gas flows from booster 106 through a passageway 114 to compressor 112 as is known in the art.

Apparatus 100 includes a nozzle 116 extending through outer casing 118 of the engine and is in flow communication with passageway 114. Nozzle 116 has a water passageway 120 extending therethrough, and includes a head 122 adapted to be fit to a hose (not shown) coupled to a water supply (not shown). Nozzle 116 may be secured in place, for example, by threads. The center axis of nozzle 116 is oriented at an angle relative to the center axis (not shown) of the engine. The spray pattern resulting from use of nozzle 116 sometimes is referred to as a radial spray pattern. The nozzles may be oriented in their installation to point more upstream or downstream in order to have the water spray penetrate further in the stream, depending upon water particle sizes.

Generally, pumps are provided to pump water to nozzle 116 from the water source. The water is pumped to nozzle 116 at a sufficient rate at pressures adequate for good spray patterns. Some high pressure compressor bleed air could be provided to allow for nozzle aspiration. At least some leading edges and pressure sides of the blades in high pressure compressor in the first five to six stages are coated with, for example, a protective hard coating. Note that only the blades are coated and the vanes need not be coated. Further, and with respect to the blades to be coated, only about 30–40% of the blades in the higher tip speed regions need be coated. Further, it may be desirable to include a water clean-up system for supplying conditioned water to the spray system. Such clean-up systems are well known.

Figure 6:
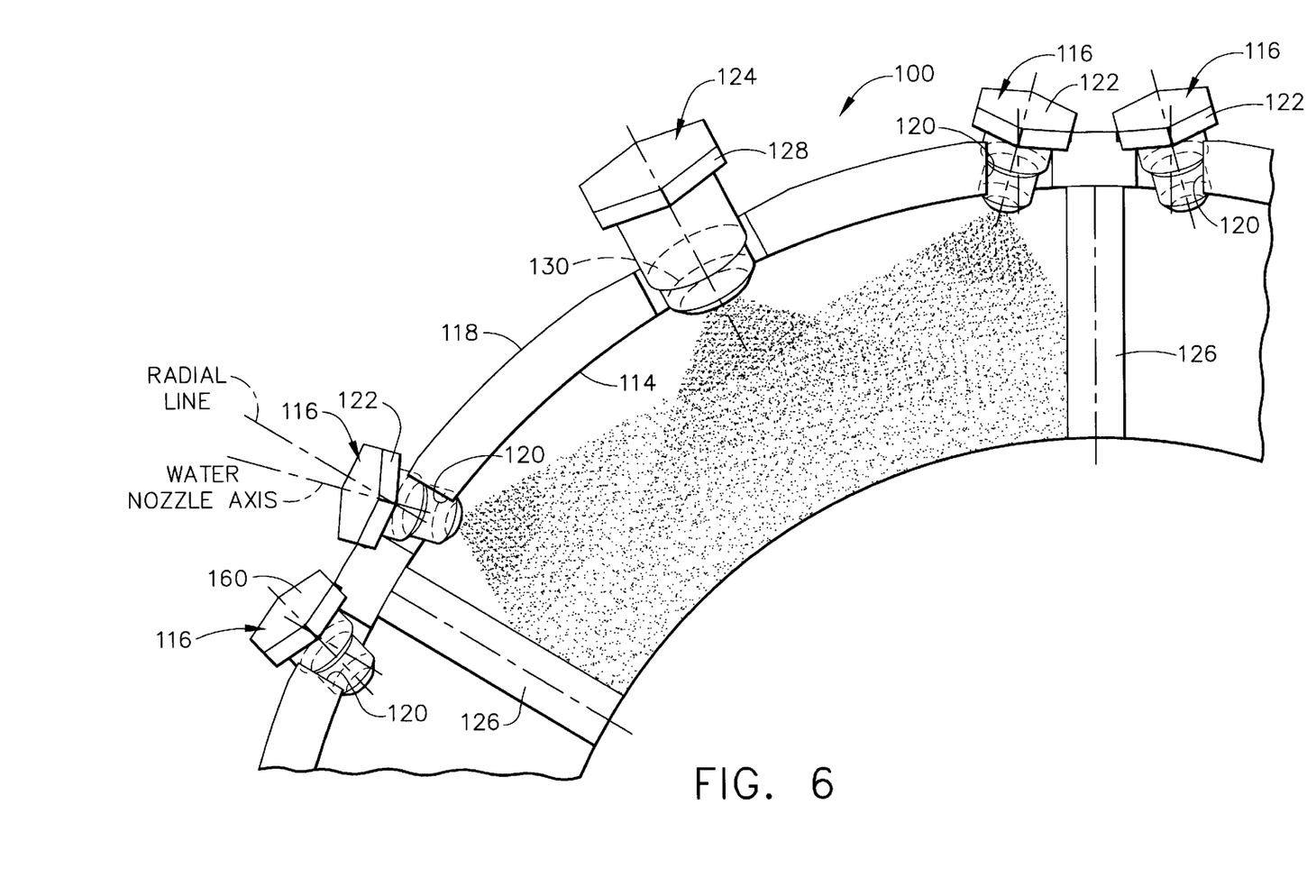
FIG. 6 is a circumferential view of the apparatus shown in FIG. 5.

FIG. 6 is a circumferential view of apparatus 100. Apparatus 100 includes nozzles 116 and 124 radially spaced along and extending through outer casing 118. Nozzles 116 and 124 are in flow communication with passageway 114. Outer casing 118 is supported by struts 126 as is known in the art. The water nozzle axis for nozzles 116 are at an angle of about 21.5 degrees with respect to the radial line of the engine as shown in FIG. 6. Nozzles 124 typically are set at zero degrees to the radial line.

Nozzles 124 include a head 128 adapted to be fit to a hose (not shown) coupled to a water supply (not shown), and nozzles 124 may be secured in place, for example, by threads. A water passageway 130 extends through nozzle 124.

Figure 7:
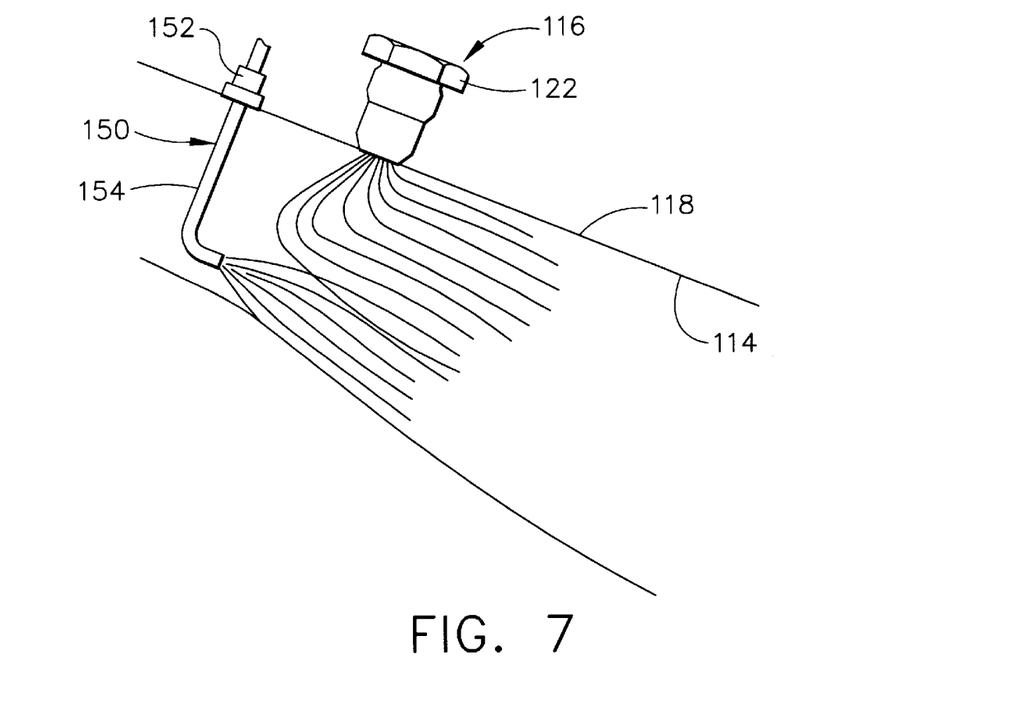
FIG. 7 is a side view of another apparatus for high pressure compressor water injection in accordance with another embodiment of the present invention.

An alternate way to assure stream penetration to the inner wall (radially) of passageway 114 would be to install additional water nozzles 150 as shown in FIG. 7. Nozzles 150 could be aerodynamically shaped for low pressure losses and could be spaced circumferentially to fill gaps in water spray near the inside wall of passageway 114. Nozzles 150 include a head 152 and extend through outer casing 118. An elongated member 154 extends into passageway 114, and water flows through head 152 and member 154 into passageway 114. Using nozzle 150, water will be sprayed into passageway 114 near the inside wall.

Practically up to 3% $\Delta$Ww spray may be put into a compressor at SHP=K. This example is for non-aspirated injection on a dual rotor gas generator driving a freewheeling power turbine such as in engines 10 and 50 shown in FIGS. 1 and 2.

| | |
|---|---|
| $\Delta$T3 | −150–170° F. approx. (T3 = compressor discharge total temperature), |
| $\Delta$T41 | −160° F. approx. (T41 = turbine rotor inlet temperature), |
| $\Delta$T42 | −100° F. approx. (T42 = turbine rotor outlet temperature), |
| $\Delta$N25 | +3.3% approx. (N25 = HP rotor speed), |
| $\Delta$N2 | −0.3 to −.7% approx. (N2 = LP rotor speed), |
| $\Delta$WF | +3.8% approx. (WF = fuel flow), and |
| $\Delta$SM25 | −8 to −12% approx. (SM25 = HP compressor stall line). |

Re-optimizing engine control areas for operation with water injection can also improve the fuel consumption back to the dry engine fuel consumption. For example, in an engine having at least one turbine (e.g., a low pressure turbine and/or a power turbine) downstream of the high pressure turbine, the flow function through such downstream turbine can be adjusted so that the engine fuel consumption with water spray injection at least approaches the fuel consumption for the same engine without water spray injection, i.e., dry engine fuel consumption.

Some pre-high pressure compressor (HPC) water spray may evaporate before entering the compressor dependent upon the ambient relative humidity and the boosted temperature of the flow field. Typically, 2.5% of evaporated water spray would be 40 micro inches or greater; 40% of water spray would be 20–40 micro inches; 34% of water spray would be 20 micro inches or smaller; and 23.5% of water spray would evaporate before the high pressure compressor for 3% water spray. The above data would be applicable for an aspirated water nozzle configuration. Typically, for an unboosted compressor, the evaporation before entry should be much less as stated later for pre-LPC injection.

Rather than, or in addition to, water spray injection at the inlet of the high pressure compressor, such injection can be performed at the inlet of the low pressure compressor or booster. Similar advantages in the decrease of T3 and T41 temperatures may be achieved by such injection along with lower compressive horsepower levels. Further, water spray injection may be performed in conjunction with intercooling.

Practically 1% $\Delta$Ww non-aspirated spray may be put into a booster at SHP=K for a dual rotor gas turbine having a free wheeling power turbine.

| | |
|---|---|
| $\Delta$T3 | −80° F. approx., |
| $\Delta$T41 | −86° F. approx., |
| $\Delta$T42 | −63° F. approx., |
| $\Delta$N25 | −0.53% approx., |
| $\Delta$N2 | +0.40% approx., |
| $\Delta$WF | up to +1.36% approx., and |
| $\Delta$SM2 | 2 to 4% lower approx. (SM2 = low pressure compressor stall line). |

Some pre-low pressure compressor (LPC) water spray may evaporate before entering the booster dependent upon the ambient relative humidity and the temperature of the air. However, the majority of spray will enter the booster and evaporate through the stages. It is expected that about 1% of water will evaporate through a 2.35 p/p booster. In most cases, pre-LPC or pre-HPC water spray will reduce emissions even if an engine is throttle pushed back to near the same T3 or T41 limit. Finally, the gas turbine can be throttle pushed with either pre-LPC or pre-HPC water injection to some other limiting parameter, such as core speed or torque.

Figure 8:
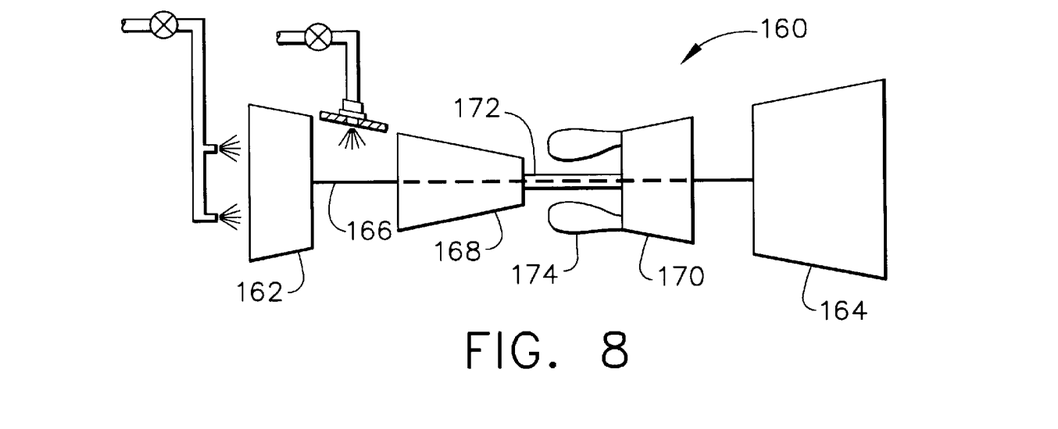
FIG. 8 is a schematic illustration of a gas turbine engine including booster and compressor water injection in accordance with still yet another embodiment of the present invention.

For example, a dual rotor gas turbine was run at SHP=K, low pressure turbine or power turbine held at 3600 RPM at 60 Hz (or 3000 RPM at 50 Hz), to evaluate aspirated water spraying up to 3% of inlet flow. Such an engine 160 is shown in FIG. 8. Engine 160 includes a booster 162 and a power turbine 164 connected by a first shaft 166, a high pressure compressor 168 and a high pressure turbine 170 connected by a second shaft 172, and a combustor 174. Engine 160 further includes pre-booster water spray injection apparatus 176 (which is the same as apparatus 24 shown in FIG. 3) and pre-compressor water spray injection apparatus 178 (which is the same as apparatus 100 shown in FIG. 6). For engine 160 including both pre-booster and pre-compressor water spray injection, and for a simple cycle engine including either pre-booster or pre-compressor water spray injection, run at SHP=k with the low pressure turbine or power turbine held at 3600 RPM, to evaluate aspirated water spraying up to 3% of inlet flow, and at a given decrement of T3, the observations were made:

1. it is estimated that the maximum aspirated water spray can reduce T3 like an intercooler having 90% effectivity up to −186° F. $\Delta$T3;

2. for simple cycles with P3 levels at or below 400 to 440 PSIA, water spraying like intercoolers, increases fuel consumption, however, SHP can be increased by throttle push, assuming no other gas turbine limits are reached;

3. booster water spray can better or match an intercooler on % $\Delta$SFC up to about 40% effectivity for an intercooler for −90° F. $\Delta$T3 decrement;

4. HPC water spray is about 0.55% $\Delta$SFC worse than booster water spray at an equivalent intercooler effectivity of 40% for −90° F. $\Delta$T3 decrement;

5. at the same T3 decrement, booster water spray removes only 55% as much heat as an intercooler whereas compressor water spray removes 82% as much heat as an intercooler;

6. at the same T3 decrement of 90° F. or more, pre-HPC water spray has less T41 and T42 decrement than that for pre-LPC water spray for an equivalent intercooler effectivity of 40% or more;

7. water spraying is very simple as compared to the size and complexity of intercoolers and much less expensive;

8. both pre-booster and pre-compressor aspirated water spray injection can be performed simultaneously, giving improved SHP performance;

9. an intercooler uses much more water to cool the gas turbine booster air than water spraying would at the same T3 decrement; and 10. intercoolers practically can only be placed at a given point within the overall pressure ratio, whereas water spray allows a more diverse placement within that overall pressure ratio, giving either an improved thermal efficiency (although still a decrement) or improved SHP at a lower thermal efficiency.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. For example, although nozzles 116 and 124 are shown as mounted on the outer wall of case 118, such nozzles 116 and 124 could be mounted on the inner wall of case 118. Accordingly, the spirit and scope of the invention are to be limited only by the terms of the appended claims.

I claim:

1. A gas turbine engine comprising:

a high pressure compressor including an inlet;

a booster compressor located upstream of said high pressure compressor;

a passageway extending through said high pressure compressor and said booster compressor;

water injection apparatus positioned at said inlet of said high pressure compressor for injecting water into gas flowing through said passageway from an outlet of said booster compressor towards said high pressure compressor, said water injection apparatus comprising a first plurality of water injection nozzles, each said nozzle comprising a head and an elongate member extending from said head and into said passageway, said nozzles configured so that water flows therethrough and into said passageway; and a heat exchanging intercooler in series flow relationship with said booster compressor and said compressor, said heat exchanging intercooler comprising an inlet coupled to said booster compressor outlet for receiving at least a portion of gas flowing from said booster compressor outlet, and an outlet coupled to said high pressure compressor inlet.

2. A gas turbine engine in accordance with claim 1 further comprising a combustor located downstream of said high pressure compressor, and wherein water injected by said water injection apparatus reduces a temperature of gas at an outlet of said high pressure compressor and at an outlet of said combustor during operation of said engine.

3. A gas turbine engine in accordance with claim 2 further comprising a heat exchanging intercooler in series flow relationship with said booster compressor and said compressor, said heat exchanging intercooler comprising an inlet coupled to said booster compressor outlet for receiving at least a portion of gas flowing from said booster compressor outlet, and an outlet coupled to said high pressure compressor inlet.

4. A gas turbine engine in accordance with claim 3 further comprising at least one waste heat recovery steam boiler located downstream of said power turbine.

5. A gas turbine engine comprising:

a booster compressor;

a passageway extending through said turbine engine and through said booster compressor;

water injection apparatus for injecting water into gas flowing through said passageway, said water injection apparatus comprising a first plurality of water injection nozzles, each said nozzle comprising a head and an elongate member extending from said head and into said passageway, said nozzles configured so that water flows therethrough and into said passageway;

a high pressure compressor located downstream of said booster compressor, said passageway extending through said high pressure compressor; and a heat exchanging intercooler in series flow relationship with said booster compressor and said high pressure compressor, said heat exchanging intercooler comprising an inlet coupled to an outlet of said booster compressor for receiving at least a portion of gas flowing from said booster compressor outlet, and an outlet coupled to an inlet of said high pressure compressor.

6. A gas turbine engine in accordance with claim 5 further comprising a combustor located downstream of said high pressure compressor, and wherein water injected by said water injection apparatus reduces a temperature of gas at an outlet of said high pressure compressor and at an outlet of said combustor during operation of said engine.

7. A gas turbine engine in accordance with claim 6 further comprising a high pressure turbine, a low pressure turbine and a power turbine located downstream of said combustor.

8. A gas turbine engine in accordance with claim 7 wherein said engine further comprises a high pressure compressor located downstream of said booster compressor, said passageway extending through said high pressure compressor.

9. A method for operating a gas turbine engine including a high pressure compressor, a booster compressor upstream of the high pressure compressor, and water injection apparatus including a first plurality of water injection nozzles, each nozzle having a head connected to an elongate member and extending into a passageway, said method comprising the steps of:

injecting water into the engine at an inlet of the high pressure compressor through the nozzles and into the passageway; and cooling the airflow from an outlet of the booster compressor using a heat exchanging intercooler and supplying the cool air to the inlet of the compressor.

10. A method in accordance with claim 9 wherein water is injected into the engine at both an inlet of the booster compressor and at an inlet of the high pressure compressor.

11. A gas turbine engine in accordance with claim 1 wherein said heat exchanging intercooler further comprises a fuel inlet and a fuel outlet, said combustor comprising a fuel inlet, said heat exchanging intercooler fuel outlet coupled to said fuel inlet of said combustor, wherein said heat exchanging intercooler delivers heated fuel to said combustor.

12. A gas turbine engine in accordance with claim 4 wherein said engine further comprises a heat exchanging intercooler in series flow relationship with said booster compressor, said heat exchanging intercooler comprising a feed water inlet and a feed water outlet, said waste heat recovery steam boiler comprising a feed water inlet, said heat exchanging intercooler feed water outlet coupled to said waste heat recovery steam boiler outlet, wherein said heat exchanging intercooler delivers heated feed water to said waste heat recovery steam boiler.

13. A gas turbine engine in accordance with claim 1 wherein said water injection apparatus further comprises a second plurality of water injection nozzles, each said second water injection nozzle comprising a second nozzle head, said second plurality of nozzles configured so that water flows therethrough and into said passageway.

14. A gas turbine engine in accordance with claim 5 wherein said water injection apparatus further comprises a second plurality of water injection nozzles, each said second water injection nozzle comprising a second nozzle head, said second plurality of nozzles configured so that water flows therethrough and into said passageway.

* * * * *